(12) United States Patent
Li et al.

(10) Patent No.: US 9,469,808 B2
(45) Date of Patent: Oct. 18, 2016

(54) LOADED PARTICLES AND THE METHOD OF PREPARING THEREOF

(71) Applicant: City University of Hong Kong, Kowloon (HK)

(72) Inventors: Yan Li, Kowloon (HK); Xianfeng Chen, New Territories (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 14/306,456

(22) Filed: Jun. 17, 2014

(65) Prior Publication Data

US 2015/0361333 A1    Dec. 17, 2015

(51) Int. Cl.

| | |
|---|---|
| B01J 21/18 | (2006.01) |
| B01J 27/20 | (2006.01) |
| B01J 31/00 | (2006.01) |
| B01J 21/04 | (2006.01) |
| B01J 23/02 | (2006.01) |
| C09K 11/06 | (2006.01) |

(52) U.S. Cl.
CPC ..................... *C09K 11/06* (2013.01)

(58) Field of Classification Search
CPC ...................................... C09K 11/06
USPC ........ 502/158, 174, 439; 8/636; 252/301.4 R
See application file for complete search history.

(56) References Cited

U.S. PATENT DOCUMENTS

| | | | | |
|---|---|---|---|---|
| 2010/0129412 A1* | 5/2010 | Kitamura | ............... | A61K 8/19 424/401 |
| 2011/0262666 A1* | 10/2011 | Choy | ............... | B41J 31/05 428/32.67 |
| 2012/0209023 A1* | 8/2012 | Parida | ............... | C07C 201/12 560/205 |

FOREIGN PATENT DOCUMENTS

| | | | | |
|---|---|---|---|---|
| JP | 2001-234090 | * | 8/2001 | ............... C09C 3/06 |
| JP | 2003-213156 | * | 7/2003 | ............... C09C 1/40 |

OTHER PUBLICATIONS

"Synthesis of Intercalation Compounds between a Layered Double Hydroxide and an Anionic Dye," Woo-Chan Jung et al. Bull. Korean Chem. Soc. 1996, vol. 17, No. 6, pp. 547-550.*
Li Yan, et al., Highly luminescent covalently bonded double hydroxide nanoparticle-fluorescent dye nanohybrids, Journal of Materials Chemistry C, Mar. 25, 2014, The Royal Society of Chemistry.

* cited by examiner

*Primary Examiner* — Patricia L Hailey
(74) *Attorney, Agent, or Firm* — Renner Kenner Grieve Bobak Taylor & Weber

(57) ABSTRACT

The present invention relates to fluorescent dye loaded particles and the method of preparing thereof. The method includes steps of preparing the nanoparticles with layered structure having at least one interlayer space, expanding the at least one interlayer space to form at least one expanded interlayer space, introducing the dye molecules to the at least one expanded interlayer space, and covalently bonding the dye molecules with the layered structure. The present invention also relates to a film comprising such nanoparticles.

19 Claims, 13 Drawing Sheets
(4 of 13 Drawing Sheet(s) Filed in Color)

Daylight

UV

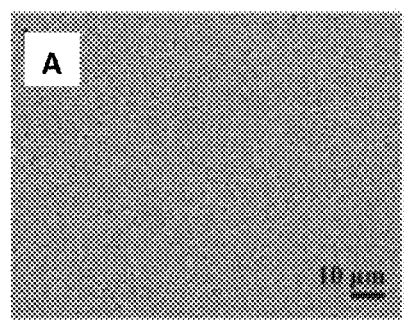
Figure 13A
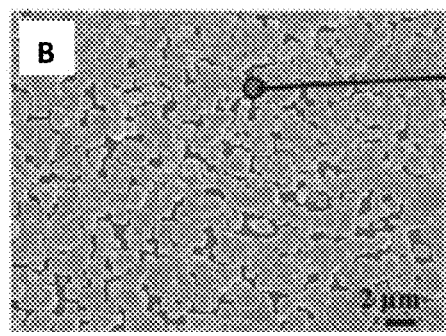 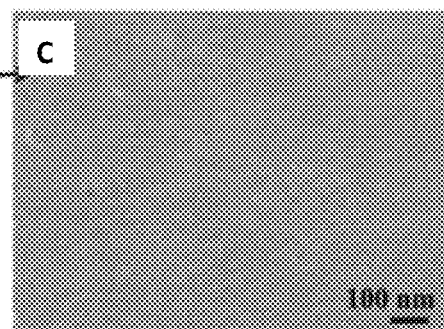
Figure 13B                Figure 13C

LOADED PARTICLES AND THE METHOD OF PREPARING THEREOF

TECHNICAL FIELD

The present invention relates to loaded particles and the method of preparing thereof, particularly although not exclusively, particles loaded with dye molecules and the method of preparing thereof.

BACKGROUND

Fluorescent dye loaded particles have been widely used in diagnosis, bioimaging and bioassay purposes. Various methods have been adopted in preparing the fluorescent particles, and particularly, layered double hydroxide (LDH) based particles have been attracting growing attention in this area. LDH is a layered material composed of bivalent and trivalent metallic cations ($M^{2+}$ and $M^{3+}$) in layers and negatively charged anions occupying the gallery in between. The LDH family can be expressed as $[M^{2+}_{1-x}M^{3+}_x(OH)_2][A^{n-}]_{x/n} \cdot zH_2O$, where $M^{2+}$ may be $Mg^{2+}$, $Zn^{2+}$, $Ni^{2+}$ or other bivalent cations and $M^{3+}$ may be $Al^{3+}$, $Ga^{3+}$, $Fe^{3+}$, $Mn^{3+}$ or other trivalent cations; $A^{n-}$ as a charge compensating anion may be $CO_3^{2-}$, $Cl^-$, etc. Since $A^{n-}$ functions as non-framework anions, other types of negatively charged ions can easily enter the gallery between the LDH layers by ion-exchange.

Owing to the powerful anion exchange capacity, positive surface charge and excellent biocompatibility, LDH nanoparticles have been widely used as carriers of negatively charged genes such as DNA and siRNA for intracellular delivery and other biomedical applications. Negatively charged fluorescent dyes can be directly loaded into the LDH layers by anion exchange. However, by undergoing anion exchange, dye molecules uncontrollably fill in the gallery or attach to the surface of the LDH nanoparticles with very high local concentration, which leads to close spacing between molecules and a corresponding concentration quenching. As a result, the resultant nano-materials retain very low fluorescence efficiency in solution and even no fluorescence in dry form, which is undesirable.

SUMMARY OF THE INVENTION

In accordance with a first aspect of the present invention, there is provided a method of preparing a particle loaded with a target molecule, comprising steps of preparing the particle with layered structure having at least one interlayer space, expanding the at least one interlayer space to form at least one expanded interlayer space, introducing the target molecule to the at least one expanded interlayer space, and covalently bonding the target molecule with the layered structure.

In an embodiment of the first aspect, the particle comprises layered double hydroxide.

In an embodiment of the first aspect, the step of preparing the particle involves reacting two metal salts in an alkaline medium under agitation.

In an embodiment of the first aspect, the step of expanding the at least one interlayer space involves reaction in the presence of a surfactant.

In an embodiment of the first aspect, the surfactant comprises sodium dodecyl sulfate.

In an embodiment of the first aspect, the step of introducing the target molecule further comprises steps of modifying the target molecule to form a modified target molecule, and reacting the modified target molecule with the layered structure having the at least one expanded interlayer space.

In an embodiment of the first aspect, the step of modifying the target molecule further comprises step of reacting the target molecule with (3-aminopropyl) triethoxysilane.

In an embodiment of the first aspect, the step of reacting the target molecule is performed in the presence of a catalyst.

In an embodiment of the first aspect, the catalyst comprises N-(3-dimethylaminopropyl)-N-ethylcarbodiimide hydrochloride.

In an embodiment of the first aspect, the step of reacting the modified target with the layered structure is performed in the presence of N-cetyl-N,N,N-trimethylammonium.

In an embodiment of the first aspect, the N-cetyl-N,N,N-trimethylammonium is priorly dissolved in methylene chloride.

In an embodiment of the first aspect, the step of reacting the modified target molecules is performed under agitation.

In an embodiment of the first aspect, the agitation is provided by ultrasonication.

In an embodiment of the first aspect, the particle is of nano size.

In an embodiment of the first aspect, the target molecule is positively charged, negatively charged, or neutral in nature.

In an embodiment of the first aspect, the target molecule is luminescent.

In an embodiment of the first aspect, the target molecule comprises fluorescent dye.

In accordance with a second aspect of the present invention, there is provided a particle loaded with a target molecule prepared according to a method comprising steps of preparing the particle with layered structure having at least one interlayer space, expanding the at least one interlayer space to form at least one expanded interlayer space, introducing the target molecule to the at least one expanded interlayer space, and covalently bonding the target molecule with the layered structure.

In accordance with a third aspect of the present invention, there is provided a film structure comprising a particle loaded with target molecule prepared according to a method comprising steps of preparing the particle with layered structure having at least one interlayer space, expanding the at least one interlayer space to form at least one expanded interlayer space, introducing the target molecule to the at least one expanded interlayer space, and covalently bonding the target molecule with the layered structure.

In an embodiment of the third aspect, the film structure is substantially transparent.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will now be described, by way of example, with reference to the accompanying drawings in which:

FIGS. 13A, 13B and 13C are scanning electron microscopic (SEM) images of the film assembled by the LDH-Co-Dye nanoparticles according to the present invention.

FIG. 13A shows the structure of the film which consists of two layers.

FIG. 13B shows the top layer of the film consisting of self-assembled cubic blocks of 1-2 μm.

FIG. 13C shows the structure of the bottom layer of the film as pointed in FIG. 13B.

DETAILED DESCRIPTION OF THE PREFERRED EMBODIMENTS

Figure 1:
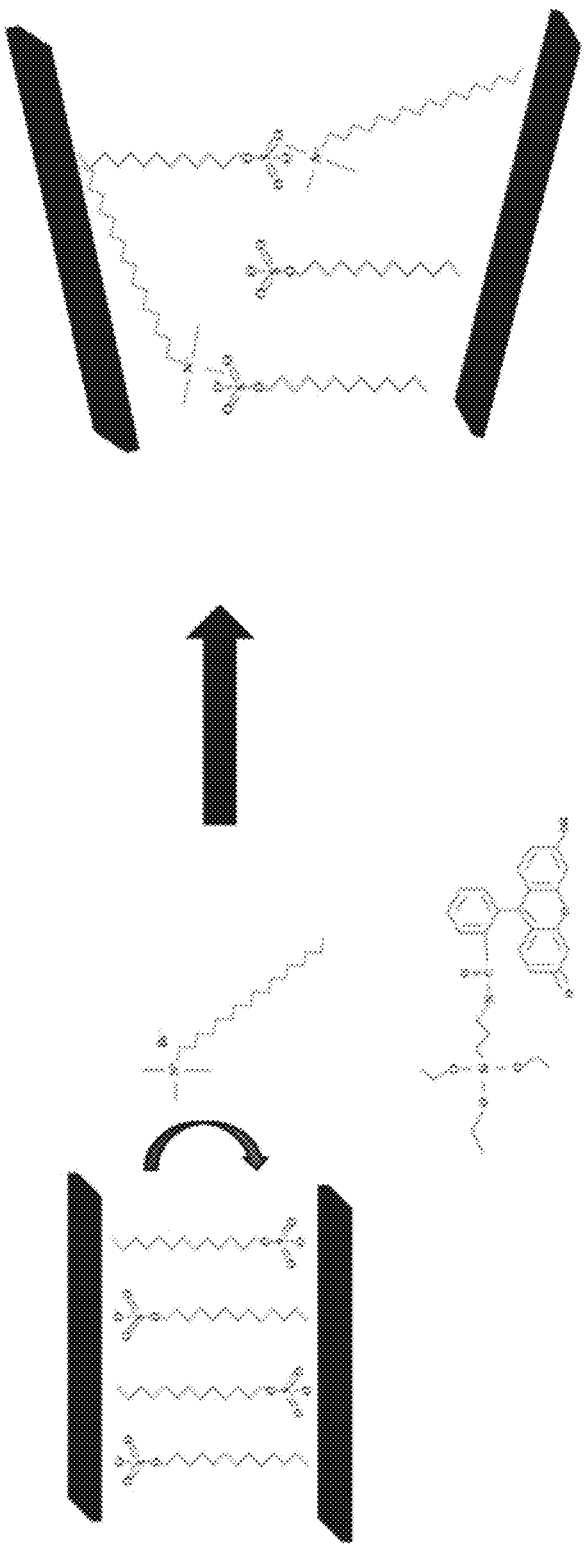
FIG. 1 is a reaction scheme showing the expansion of one of the interlayer space of the LDH nanoparticles by sodium dodecyl sulphate (SDS) according to an embodiment of the present invention.
Figure 2:
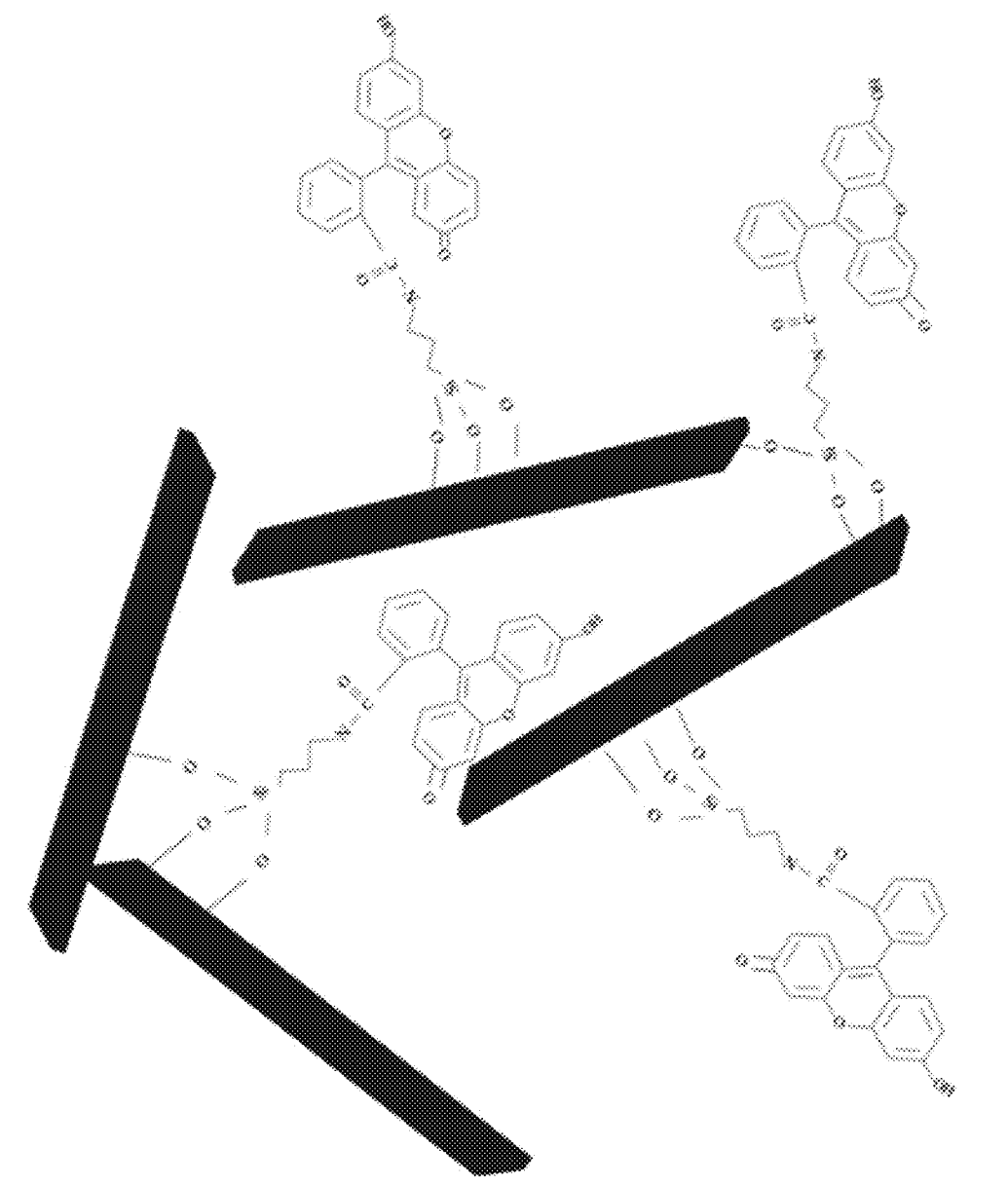
FIG. 2 shows the LDH layers of FIG. 1 after conjugation with fluorescein.

FIGS. 1 and 2 illustrated a method of preparing nanoparticles loaded with target molecules such as fluorescent dyes. The method comprises steps of preparing the nanoparticles with layered structure having at least one interlayer space, expanding the at least one interlayer space to form at least one expanded interlayer space, introducing the dye molecules to the at least one expanded interlayer space, and covalently bonding the dye molecules with the layered structure.

In this specific embodiment, the nanoparticles composed of layered double hydroxide (LDH) as shown in FIG. 1. The LDH nanoparticles were prepared by a co-precipitation method. Specifically, the method involves reacting two metal salts in an alkaline medium under stirring to form the LDH nanoparticles.

A surfactant, such as but is not limited to sodium dodecyl sulfate (SDS) was used to expand the interlayer space, or the so-called "gallery" of the LDH nanoparticles. In the context of the following description, the LDH nanoparticles having expanded interlayer space resulted from a reaction in the presence of SDS is referred to as LDH-SDS. Structure of the LDH-SDS is shown in FIG. 1.

To covalently attach the fluorescent dye with the layered structure of the LDH-SDS, fluorescein sodium salt molecules were firstly covalently bonded to (3-Aminopropyl) triethoxysilane (APTES) in presence of N-(3-Dimethylaminopropyl)-N-ethylcarbodiimide hydrochloride (EDC) as a catalyst. The APTES modified fluorescent dyes are hereinafter denoted as APTES-Dye. Structure of the APTES-Dye is shown also in FIG. 1.

The APTES-Dye was then incorporated with the LDH-SDS nanoparticles by reacting with N-cetyl-N,N,N-trimethylammonium (CTAB) dissolved in methylene chloride with ultrasonication. Structure of the resulted dye loaded LDH-SDS nanoparticles, which are hereinafter referred to as LDH-Co-Dye, is shown in FIG. 2. The role of CTAB is to react with SDS by forming salt to extract it from the LDH gallery.

EXPERIMENTAL

Preparation of Nanoparticles:

80 mL of 0.15 M NaOH (international Laboratory, USA) solution with 4 mmol of SDS (Acros) was mixed with 20 mL of solution containing 2.0 mmol of $MgCl_2$ (International Laboratory, USA) and 1.0 mmol of $AlCl_3$ (Sigma, USA) under vigorous stirring. The container was sealed and the solution was stirred for 10 minutes. Next, the solution was centrifuged and washed once with water. The obtained slurry was dispersed in 80 mL of water and stirred at 80° C. for 24 hours in an airtight container under a $N_2$ atmosphere. After heat treatment, the LDH-SDS particles were separated by centrifugation at 4000 rpm for 5 minutes and dried under vacuum. Pristine LDH nanoparticles were prepared according to the method described by Xu et al[1,2]. Briefly, 40 ml of 0.15 M NaOH (International Laboratory, USA) solution was mixed with 10 ml of solution containing 2.0 mmol of $MgCl_2$ (International Laboratory, USA) and 1.0 mmol of $AlCl_3$ (International Laboratory, USA) under vigorous stirring. The container was sealed and the solution was stirred for 10 minutes. Next, the solution was centrifuged and washed once with water. The obtained slurry was dispersed in 40 ml of water and hydrothermally treated at 80° C. for 4 hours in an airtight container.

Preparation of Fluorescein Sodium Salt Conjugated Nanoparticles:

2 mg of fluorescein sodium salt (International Laboratory, USA) was mixed with 2 mL of (3-aminopropyl) triethoxysilane(International Laboratory, USA) for 48 hours in the presence of N-(3-Dimethylaminopropyl)-N-ethylcarbodiimide hydrochloride (EDC) (Acros, USA) as a catalyst. 100 mg of LDH-SDS nanoparticles were further dried in vacuum for 3 minutes before the next stage of the reaction. 7.5 mL of methylene chloride (Acros, USA) was mixed with 0.4625 g N-cetyl-N,N,N-trimethylammonium (CTAB) (Acros, USA) at 40° C. to make CTAB fully dissolvable in methylene chloride. Then, the prepared fluorescein sodium salt conjugated APTES and methylene chloride with CTAB solution were simultaneously added into a glass vial containing 100 mg of LDH-SDS nanoparticles. Subsequently, the solution was ultrasonicated for 30 minutes at around 40-45° C. After sonication, the solution was continuously stirred for 24 hours at 40-45° C. Finally, the prepared nanoparticles were collected by centrifugation and washed with methylene chloride.

Fabrication of Films:

Pristine LDH solution was fabricated by the method reported by Xu et al.[2] Briefly, 40 mL of 0.15 M NaOH (International Laboratory, USA) solution was mixed with 10 mL of solution containing 2.0 mmol of $MgCl_2$ (International Laboratory, USA) and 1.0 mmol of $AlCl_3$ (International Laboratory, USA) under vigorous stirring. The container was sealed and the solution was stirred for 10 minutes. Next, the solution was centrifuged and washed once with water. The obtained slurry was dispersed in 40 mL of water and hydrothermally treated at 80° C. for 4 hours in an airtight container. The concentration of LDH is about 0.4 wt %, determined by weighing the LDH mass collected from suspension. 10 mg of the fabricated nanocomposite was mixed with 10 mL of pristine LDH solution and 5 ml of Millipore water with strong sonication for 30 minutes. The nanoparticle suspension was centrifuged at 500 rpm to precipitate non-dispersed nanoparticles and the supernatant solution was dried in a 60° C. oven to form a transparent film.

Characterization of the Fabricated Films:

The fabricated film was observed by scanning electron microscopy (FEG-SEM JEOL JSM-6335 F). Zeta potentials were measured by dynamic light scattering using a Zetasizer (Malvern). Transmission electron microscopy was performed by Philips CM20 instrument. The photoluminescence spectra and UV-Vis absorption spectra were measured using an Edinburgh Instrument FLD920P spectrometer with a 450 W xenon lamp as the steady-state excitation source and a Varian Cary 50 UV-visible spectrophotometer, respectively. Powder X-ray diffraction patterns were collected with a Smartlab instrument using Cu—$K_\alpha$ radiation. FTIR spectra were measured by a Perkin-Elmer 2000 FTIR spectrometer.

Results and Discussion

Figure 3:
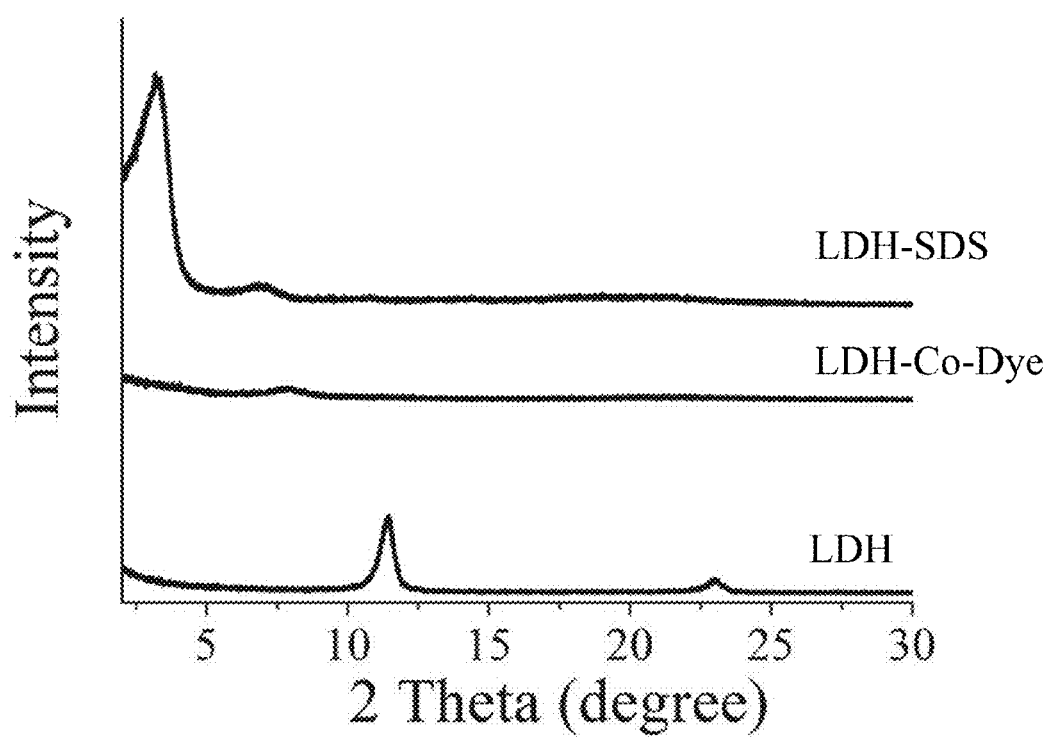
FIG. 3 shows the powder X-ray diffraction (XRD) patterns of the SDS expanded LDH nanoparticles (LDH-SDS) of FIG. 1, the fluorescein conjugated LDH nanoparticles (LDH-Co-Dye) of FIG. 2 and pristine LDH nanoparticles (LDH)

In the first step, LDH nanoparticles were prepared by a co-precipitation method. Sodium dodecyl sulfate (SDS) was used to expand the gallery of the LDH nanoparticles to form the SDS expanded LDH nanoparticles (LDH-SDS). X-ray diffraction (XRD) patterns of the synthesized LDH-SDS, LDH-Co-Dye and pristine LDH nanoparticles are presented in FIG. 3. The (003) diffraction peak of pristine $Mg_2$—Al—Cl LDH at 2θ=11.4° indicates a basal spacing of 7.7 Å between LDH layers. After SDS was incorporated into the layers, the peak shifts to 3.3°, from which the interlayer space was calculated to be 26.8 Å. It is apparent that the interlayer distance was dramatically increased, because of the attachment of SDS molecules.

In the second step, fluorescein sodium salt molecules are modified by covalently attached to (3-Aminopropyl) triethoxysilane(APTES) in the presence of N-(3-Dimethylaminopropyl)-N-ethylcarbodiimide hydrochloride (EDC) as a catalyst to form the APTES-Dye.

Figure 4:
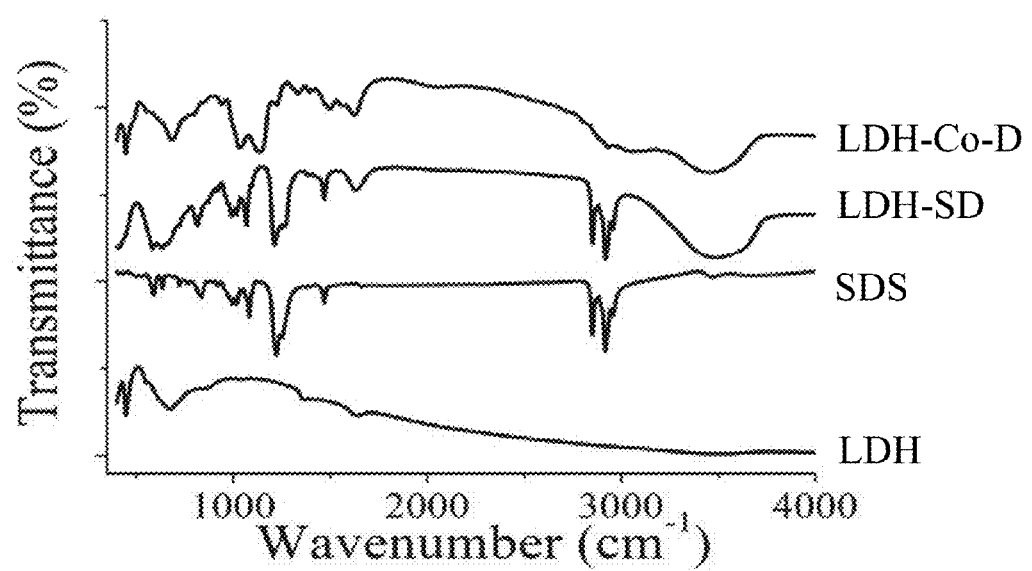
FIG. 4 is a fourier transform infrared spectroscopy (FTIR) of the fluorescein conjugated LDH nanoparticles (LDH-Co-Dye) of FIG. 2, the LDH-SDS nanoparticles of FIG. 1, SDS molecules (SDS), and the pristine LDH nanoparticles (LDH)

In the third step, the APTES-Dye was then incorporated with the LDH-SDS nanoparticles by standing for 24 hours in methylene chloride with N-cetyl-N,N,N-trimethylammonium (CTAB) with ultrasonication for the initial 30 minutes to form the LDH-Co-Dye. The role of CTAB is to react with SDS by forming salt to extract it from the LDH gallery. FIG. 4 shows the Fourier transform infrared spectroscopy (FTIR) data for four samples including pristine LDH nanoparticles, SDS molecules, LDH-SDS nanoparticles and LDH-Co-Dye nanoparticles. C—H stretching modes at 2963, 2932 and 2842 $cm^{-1}$ are observed from the spectrum of the LDH-SDS sample. These modes are not present in the spectrum of the LDH nanoparticles, indicating successful attachment of the SDS to the LDH nanoparticles. The bonds of the —$SO_4$ group at 826 and 1062 $cm^{-1}$ are observed in the spectrum of the LDH-SDS sample, which also suggests that the SDS molecules are attached to LDH nanoparticles. Significant diminution of these peaks in the spectrum of LDH-Co-Dye nanoparticles indicates the successful removal of SDS after the covalent bonding of fluorescein sodium salt molecules to the LDH nanoparticles. The broad band at 1000-1200 $cm^{-1}$ in the spectrum of the LDH-Co-Dye nanoparticles can be ascribed to the Si—O—Si asymmetric stretching vibration, which confirms the attachment of APTES-Dye to the LDH nanoparticles.

Figure 5:
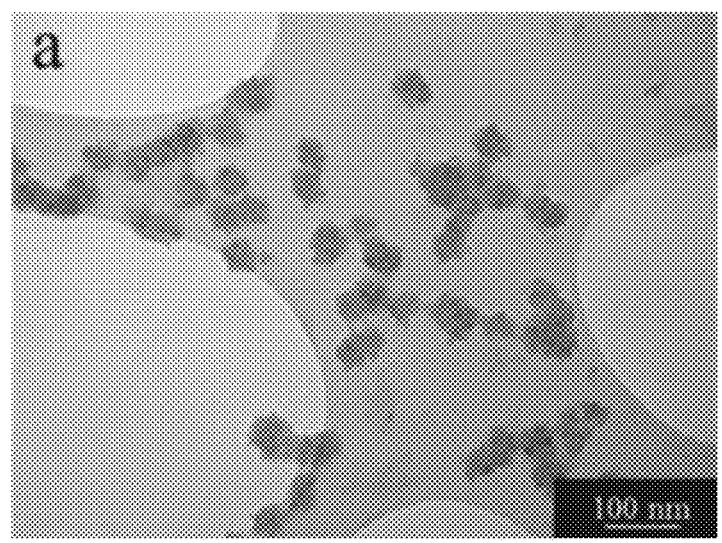
FIG. 5 is a transmission electron microscopy (TEM) image of well dispersed LDH-Co-Dye nanoparticles of FIG. 2.

The TEM image of FIG. 5 shows that the fabricated LDH-Co-Dye nanoparticles are about 50 nm in size. The zeta potential of the fabricated LDH-Co-Dye nanoparticles was measured to be positively charged (+48.7 mV), which is very similar to that of the pristine LDH, indicating that the covalent bonding does not affect the positive charge of the LDH nanoparticles.

Figure 6:
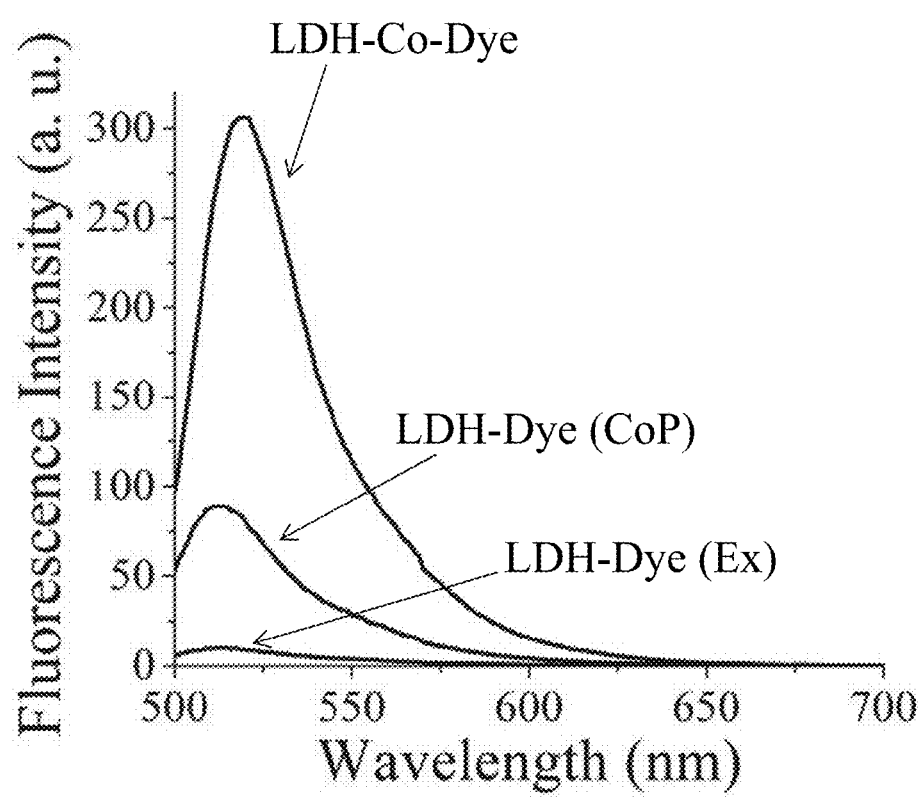
FIG. 6 is an emission spectra of the fluorescein covalently conjugated LDH nanoparticles (LDH-Co-Dye) of FIG. 2, and LDH-dye hybrid prepared by ion-exchange (LDH-Dye (Ex)) or co-precipitation (LDH-Dye (CoP))

To confirm that the high quantum efficiency of fluorescein sodium salt can be retained by covalently bonding the dye molecules to the LDH layers, the optical properties of the as-prepared LDH-Co-Dye nanoparticles were studied and the results were compared with the LDH-Dye nanoparticles made by conventional ion-exchange (LDH-Dye (Ex)) or co-precipitation (LDH-Dye (CoP)). To simply compare the fluorescein efficiency, the three samples were excited at 489 nm, at which the absorbance of LDH-Dye (CoP) and the LDH-Co-Dye nanoparticles are the same. The emission spectra of the samples are shown in FIG. 6. The results show that, at the same absorbance, the fluorescence intensity of the LDH-Co-Dye nanoparticles is as high as four times of that of the LDH-Dye (CoP) nanoparticles. In great contrast, the LDH-Dye (Ex) nanoparticles prepared by the ion-exchange approach display negligible emission, indicative of serious fluorescence quenching. These contrasting results indicate that covalently bonding dye molecules to LDH interlayers can effectively maintain their fluorescence efficiency.

Figure 7:
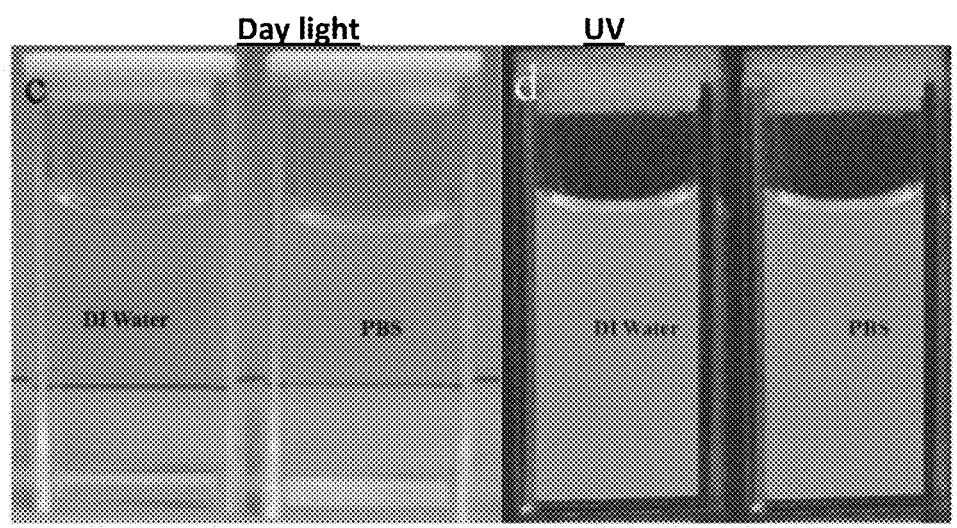
FIG. 7 shows the LDH-Co-Dye nanoparticles of FIG. 2 in deionised (DI) water and phosphate buffered saline (PBS) solution under day light (left) and UV illumination (right)

Furthermore, quantum yields (QYs) of the LDH-Co-Dye nanoparticles were also determined by absolute measurement with integrated sphere. The results were compared with those of the free fluorescein sodium salt and the LDH nanoparticles made from ion-exchange or co-precipitation as shown in Table 1. The LDH-Co-Dye nanoparticles showed a significant higher QY of 55.1% than both LDH-Dye (CoP) (12.4%) and LDH-Dye (Ex) (3.0%) nanoparticles. The LDH-Co-Dye nanoparticles can be well-dispersed in deionized (DI) water and phosphate buffered saline (PBS). As shown in FIG. 7, the nanoparticles solution in both DI water and PBS are clearly transparent and remain highly fluorescent under UV illumination, indicating that LDH-Co-Dye nanoparticles are promising for bioimaging applications.

TABLE 1

| | Free Dye | LDH-Co-Dye | LDH-Dye (CoP) | LDH-Dye (Ex) |
|---|---|---|---|---|
| QY (%) | 70 | 55.1 | 12.4 | 3.0 |

The QY of the LDH-Co-Dye is lower than that of the free dye in solution at low concentration and this may suggest that the spacing between the covalently bonded dye molecules should be further increased. However, the LDH-Co- Dye nanoparticles as prepared according to the present invention nonetheless have a number of advantages over the free dye.

Figure 8:
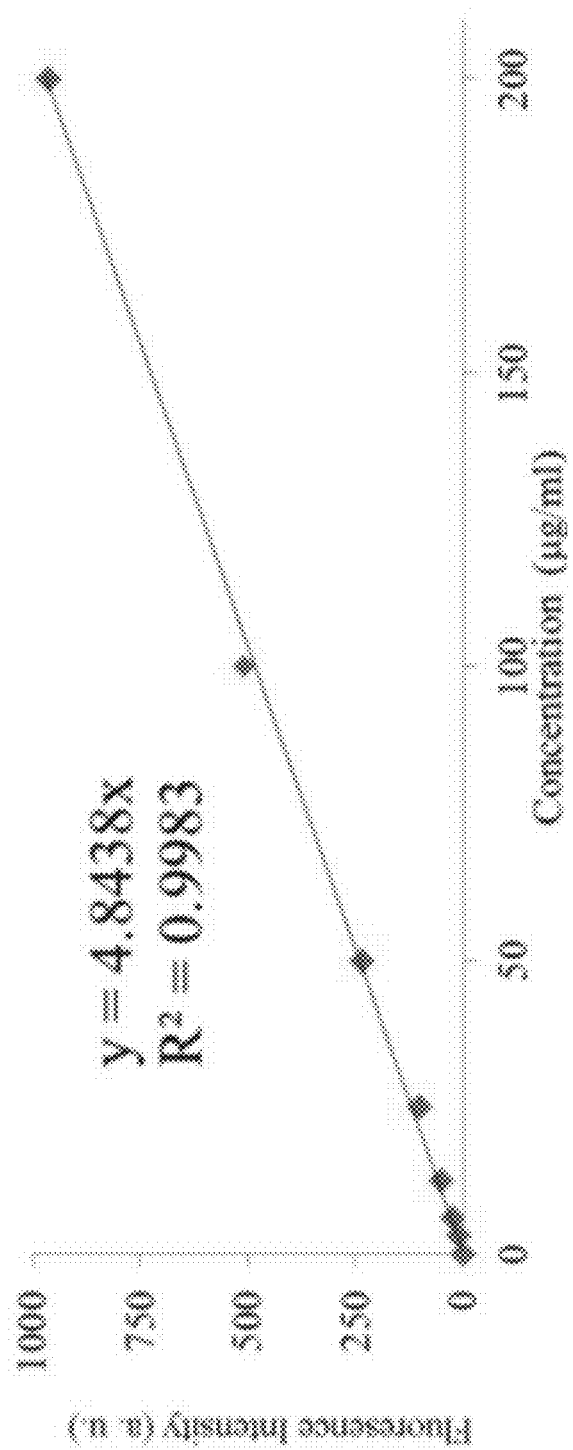
FIG. 8 shows the fluorescence emission intensity of the fluorescein covalently conjugated LDH nanoparticles (LDH-Co-Dye) of FIG. 2 as function of nanoparticles concentration.

Firstly, the fluorescence emission intensity of the LDH-Co-Dye as a function of concentration was studied ($\lambda_{ex}$=495 nm, $\lambda_{em}$=520 nm). As shown in FIG. 8, at concentrations from 3.125 to 200 μg/mL, the fluorescence of the LDH-Co-Dye exhibited an excellent linearity with concentration. In contrast, the fluorescence intensity of free fluorescein sodium salt molecules does not follow this trend (data not shown), with the fluorescence efficiency changing far more rapidly with concentration, which makes quantitative analysis challenging.

Figure 9:
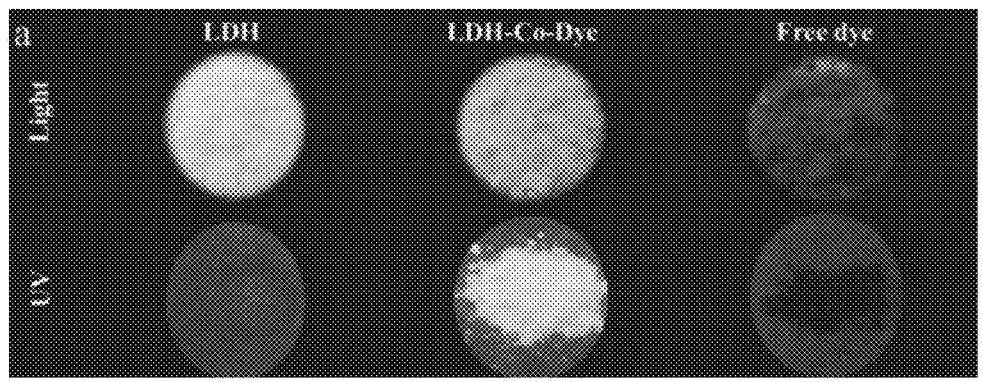
FIG. 9 shows the pristine LDH (LDH), the fluorescein covalently conjugated LDH nanoparticles (LDH-Co-Dye) of FIG. 2, and free dye under day light and UV illumination.
Figure 10:
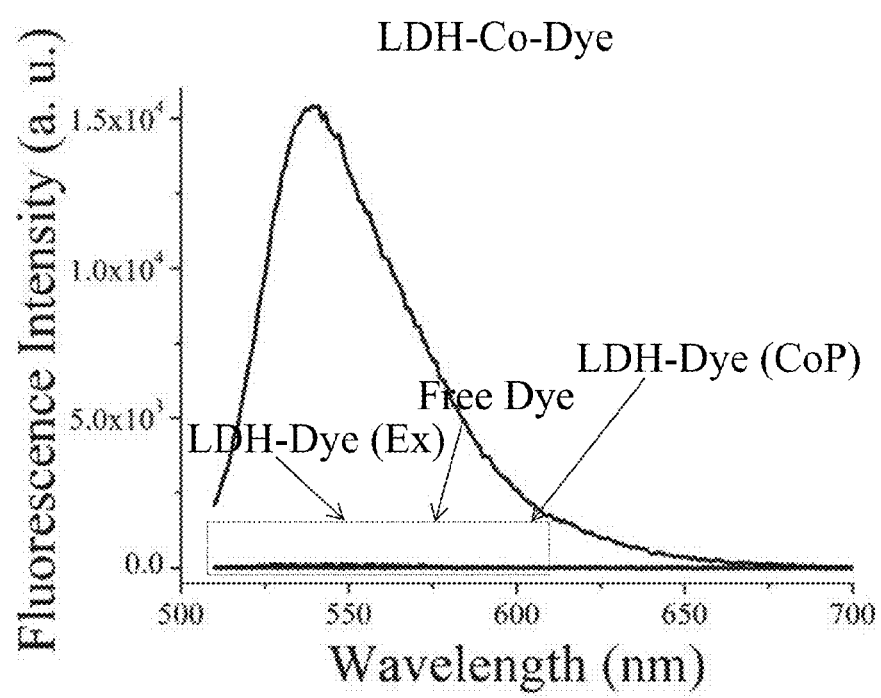
FIG. 10 is a solid-state emission spectra of free dye, the fluorescein covalently conjugated LDH nanoparticles (LDH-Co-Dye) of FIG. 2, and LDH-dye hybrid prepared by ion-exchange (LDH-Dye (Ex)) or co-precipitation (LDH-Dye (Co))
Figure 11:
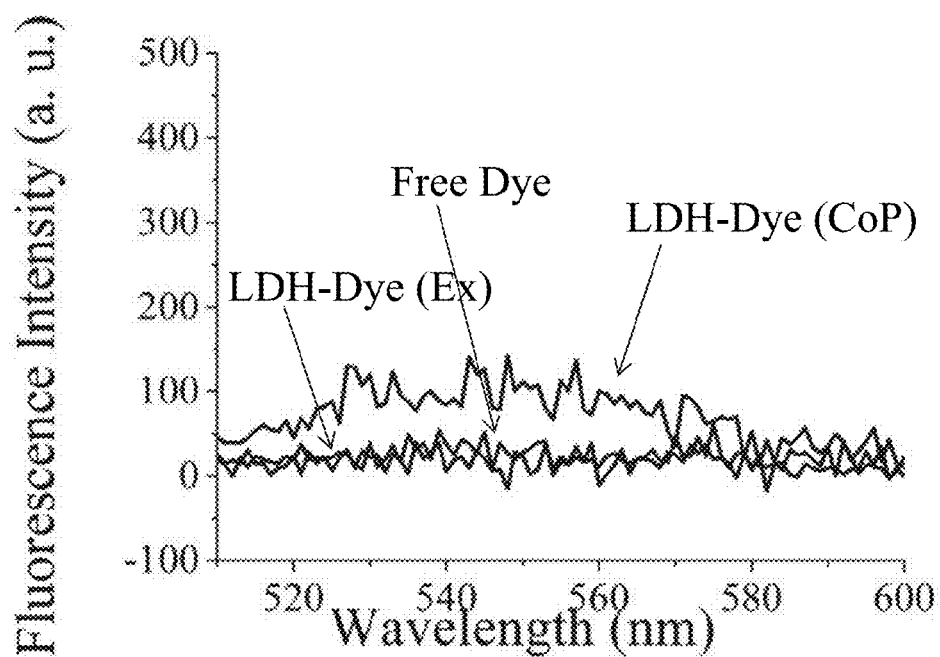
FIG. 11 is a magnified solid-state photoemission spectra of the indicated area marked in FIG. 10.

Secondly, the fluorescent LDH-Co-Dye nanoparticles are also fluorescent in dry powder form. To demonstrate this, the pristine LDH and the LDH-Co-Dye nanoparticles were dried as powders and images were taken under daylight and UV light. Free dye powder was used as a reference for comparison. As shown in FIG. 9, it is shown that the pristine LDH nanoparticles and free fluorescent dye powder are not fluorescent under UV while the LDH-Co-Dye nanoparticles are strongly luminescent. FIGS. 10 and 11 also show the solid state fluorescence spectra of different powders, which revealed that the free dye molecules, the LDH-Dye (Ex) and the LDH-Dye (CoP) nanoparticles were completely quenched in dry form, while the LDH-Co-Dye nanoparticles retained their strong emission.

Figure 12:
FIG. 12 is a digital image showing a transparent LDH-Co-Dye film according to the present invention under. The film is subjected to UV excitation (lower) and day light (upper)

There is a growing interest in the area of LDH chemistry to fabricate LDH crystallites into well-organized two-dimensional structures (films or membranes) for practical applications. After confirming that the covalent bonding of the embodied LDH-Co-Dye nanoparticles can significantly mitigate the fluorescence quenching of dye molecules in the LDH matrices, methods to assemble these nanoparticles into self-supporting films have also been investigated. FIG. 12 shows digital images of a self-supporting transparent film (top) and the same film under UV exposure (bottom). This type of self-supporting films can be prepared with dimensions of centimetres. The films show not only very strong photoluminescence under UV exposure, but are also transparent to some extent. The structure of the synthesized self-supporting film was characterized by scanning electron microscopy (SEM), and the results are shown in FIG. 13. Interestingly, the film was found to consist of two layers, with the top layer full of self-assembled cubic blocks of 1-2 μm (see FIG. 13B) while the base layer containing densely packed, highly oriented nanoparticles (see FIG. 13C). Such a structure is important for the transparency of the films because of its capacity of greatly reduced light scattering.

Furthermore, the present invention is not limited to negatively charged dye molecules (e.g. fluorescein sodium salt), but also for a wide range of positively charged (e.g. Rhodamine B) and neutral dye molecules. The prepared LDH-Rhodamine B nanoparticles are found to exhibit very high fluorescence in dry powder form and can be used to make highly transparent and fluorescent films (data not shown). The present invention is expected to have wide applications in fluorescent coating, fluorescent nanopowders and optical devices. The present invention is also expected to demonstrate high cell membrane penetration capability, which makes it excellent for bioimaging applications.

In summary, the present invention allows a controlled loading of target molecules such as fluorescent dyes to the interlayers of the LDH nanoparticles. The resulted LDH-Co-Dye nanoparticles are helpful of suppressing concentration quenching of the fluorescence and thus maintaining the fluorescence efficiency. They possess much higher emission QYs than those of other hybrid nanoparticles which were produced by existing approaches including ion-exchange and co-precipitation. The LDH-Co-Dye nanoparticles can be well dispersed in water and PBS and the fluorescence intensity linearly increases with concentration in a certain range, which is an excellent characteristic for quantitative analysis.

Attractively, the LDH-Co-Dye nanoparticles remain strong fluorescence even in powder form, and can be used to from highly fluorescent and transparent free-standing films with substantial mechanical properties, all of which cannot be realized by free dye molecules or with conventional LDH nanoparticles prepared by ion-exchange and co-precipitation.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

REFERENCE:

[1] Z. Xu, G. Stevenson, C. Lu, and G. Q. Lu, J. Phys. Chem. B, 2006, 110, 16923.
[2] Z. Xu, G. Stevenson, C. Lu, G. Lu, P. Bartlett and P. Gray, J. Am. Chem. Soc., 2006, 128, 36

The invention claimed is:
1. A method of preparing a particle loaded with a target molecule, comprising steps of:
   preparing the particle with layered structure having at least one interlayer space,
   expanding the at least one interlayer space to form at least one expanded interlayer space,
   introducing the target molecule to the at least one expanded interlayer space by modifying the target molecule to form a modified target molecule, and
   covalently bonding the modified target molecule with the layered structure.
2. The method according to claim 1, wherein the particle comprises layered double hydroxide.
3. The method according to claim 1, wherein the step of preparing the particle involves reacting two metal salts in an alkaline medium under agitation.
4. The method according to claim 1, wherein the step of expanding the at least one interlayer space involves reaction in the presence of a surfactant.
5. The method according to claim 4, wherein the surfactant comprises sodium dodecyl sulfate.
6. The method according to claim 1, wherein the step of modifying the target molecule further comprises step of reacting the target molecule with (3-aminopropyl) triethoxysilane.
7. The method according to claim 1 wherein the step of modifying the target molecule is performed in the presence of a catalyst.
8. The method according to claim 7, wherein the catalyst comprises N-(3-dimethylaminopropyl)-N-ethylcarbodiimide hydrochloride.
9. The method according to claim 1, wherein the step of covalently binding the modified target with the layered structure is performed in the presence of N-cetyl-N,N,N-trimethylammonium.

10. The method according to claim 9, wherein the N-cetyl-N,N,N-trimethylammonium is priorly dissolved in methylene chloride.

11. The method according to claim 1 wherein the step of covalently binding the modified target molecules is performed under agitation.

12. The method according to claim 11, wherein the agitation is provided by ultrasonication.

13. The method according to claim 1, wherein the particle is of nano size.

14. The method according to claim 1, wherein the target molecule is positively charged, negatively charged, or neutral in nature.

15. The method according to claim 1, wherein the target molecule is luminescent.

16. The method according to claim 15, wherein the target molecule comprises fluorescent dye.

17. A particle loaded with a target molecule prepared according to the method of claim 1.

18. A film structure comprising the particle loaded with target molecule prepared according to the method of claim 1.

19. The film structure according to claim 18, wherein the film structure is substantially transparent.

* * * * *